United States Patent [19]

Kiploks et al.

[11] 4,156,744
[45] May 29, 1979

[54] PROCESS FOR FORMING SHAPED POTATO PRODUCTS AND PRODUCTS RESULTING THEREFROM

[75] Inventors: Elmars M. Kiploks; James D. O'Neil, both of Minneapolis, Minn.

[73] Assignee: The Pillsbury Company, Minneapolis, Minn.

[21] Appl. No.: 831,638

[22] Filed: Sep. 8, 1977

Related U.S. Application Data

[63] Continuation-in-part of Ser. No. 677,103, Apr. 15, 1976, abandoned.

[51] Int. Cl.² ............................................. A23L 1/216
[52] U.S. Cl. .................................. 426/637; 426/438; 426/464; 426/516
[58] Field of Search ............... 426/637, 321, 438, 464, 426/516

[56] References Cited

U.S. PATENT DOCUMENTS

| 3,725,087 | 4/1973 | Miller et al. | 426/516 |
| 3,812,274 | 5/1974 | Weaver et al. | 426/438 |

OTHER PUBLICATIONS

Talburt et al., Potato Processing, The Avi Publishing Co. Inc., 1967, pp. 440–442.

Primary Examiner—Jeanette M. Hunter
Attorney, Agent, or Firm—Mart C. Matthews; Michael D. Ellwein; James V. Harmon

[57] ABSTRACT

Cooked and shaped potato products such as french fries, scalloped, au gratin potatoes or potato chips are prepared by first cooking of potatoes sufficiently so that they can be mashed. They are then peeled and subdivided, for example, by ricing them. The subdivided potatoes are supported as a porous mass and partially dried either at atmospheric pressure or vacuum while being agitated to reduce the moisture content to about 29–40% solids by weight. The predried potatoes are then formed to a predetermined shape. When extrusion formed, the forming die should have sufficient open area to maintain nozzle pressure at about 15 ps or less. The shaped pieces are preferably further dried and either refrigerated or frozen. Just before they are eaten they are heated preferably by frying them in fat.

21 Claims, 4 Drawing Figures

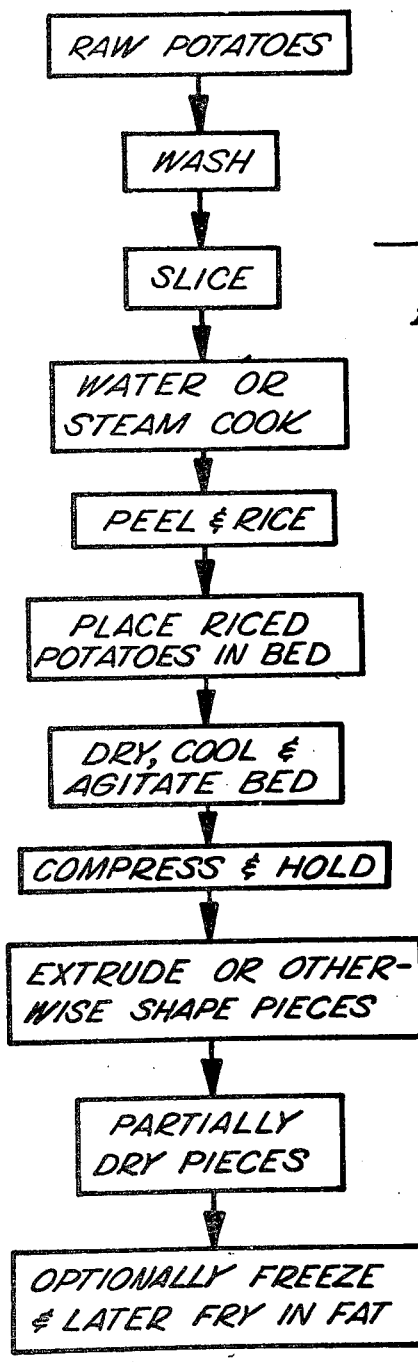
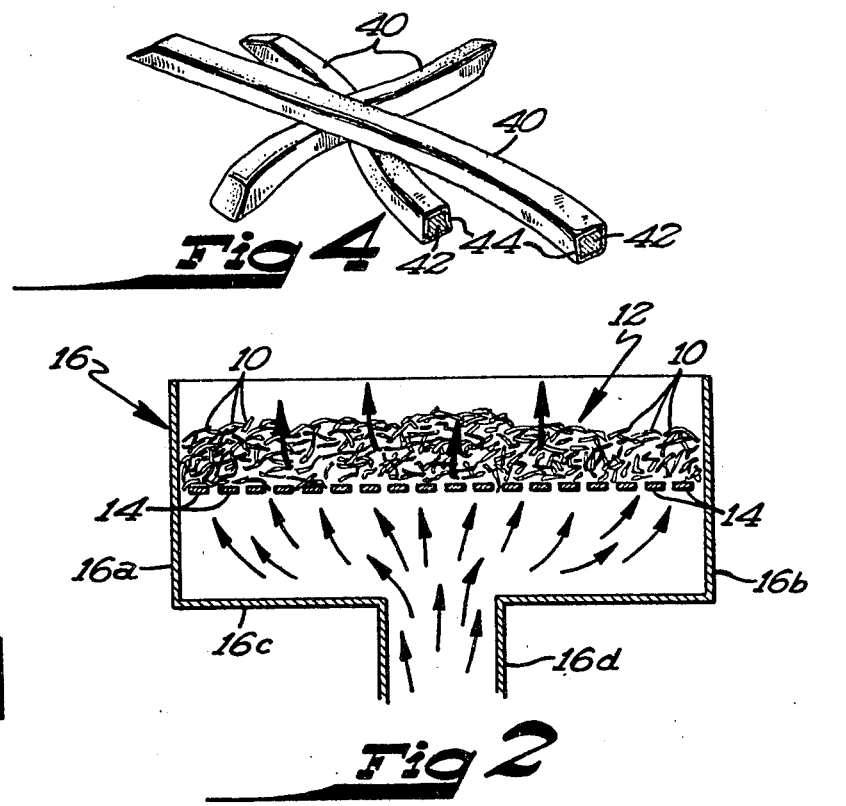
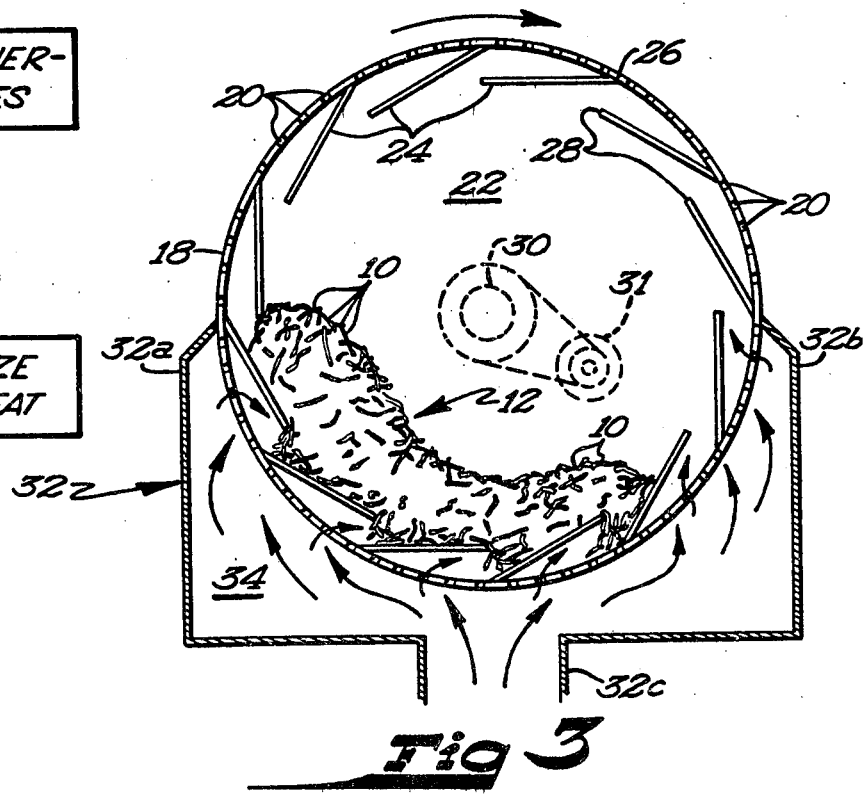

PROCESS FOR FORMING SHAPED POTATO PRODUCTS AND PRODUCTS RESULTING THEREFROM

This is a Continuation-in-Part of an application bearing the same title filed Apr. 15, 1976, Ser. No. 677,103 (now abandoned) the benefit of which is sought by the applicants.

FIELD OF THE INVENTION

The invention relates to the production of potato products that are molded, extruded or otherwise formed from a cooked potato mash and to improvements in the eating characteristics of such products.

THE PRIOR ART

A recently developed process for preparing potato products fabricated from a cooked potato mash is described in U.S. Pat. No. 3,812,274. The process provides a great many advantages over conventional french fries, among them being a substantial reduction in peel loss, the ability to use very small or odd sized potatoes that are unsuited to be cut into conventional french fried potatoes, protection of the interior by a crisp crust and the ability to prepare pieces and freeze them for future use. The finished product does, however, have some decided shortcomings. First, there is a certain degree of pastiness in the finished product which results from starch damage. This reduces the consumer acceptance of the product. In addition, the interior of the finished pieces have a soft mashed potato consistency and contains voids, i.e., tubular holes which usually run lengthwise of the pieces instead of having the firm consistency normally associated with the interior of a conventional french fried or scalloped potato. This mushiness has been found objectionable by many users. Moreover, it was discovered that when partially dried potato mash is extruded by prior art methods, the physical characteristics of the finished product are unsatisfactory. For example, a relatively high extrusion pressure exists and it was discovered that extrusion conditions can cause a skin to form on the surface which interferes with subsequent treatment. The extruded potato also tends to become torn around the edges or have surface cracks or fissures unlike the surface of a regular french fried, scalloped or hash brown potato.

The finished potato also sometimes suffers from off flavors which have been difficult to eliminate.

One feature of the invention is the provision of a drying step prior to forming to reduce the moisture content to within critical limits. Merely heating potatoes, e.g., mashed potatoes, prior to forming has been tried by us and was found unsatisfactory primarily because moisture is lost very slowly, surface drying can be a problem, and the finished product tends to be pasty particularly if mixed in a steam jacketed blender as in U.S. Pat. No. 3,725,087. Moreover, heating potatoes in a mixer adversely affects, i.e., inhibits for the processing steps such as surface texturizing by moisturization from becoming effective probably because of excessive free starch.

OBJECTS

In view of these shortcomings of the prior art, the major object of the invention is to provide an improved process for forming cooked shaped potato products from a mash with the following characteristics and advantages: (a) a reduction in starch damage and a corresponding reduction in the pastiness of the finished product, (b) a reduction or elimination of the mushy mash potato consistency in the interior of the finished product particularly when preparing simulated french fried potatoes, (c) an improvement in forming properties and particularly an improvement in the ease of extrusion whereby the mash can be pressed from an extrusion device more easily and will more reliably retain its shape after being formed, (d) the accomplishment of these objectives without seriously impairing the flavor of the finished product, and (e) the provision of a means for preventing the potato surface from being toughened during extrusion.

THE FIGURES

FIG. 1 is a flow chart showing one preferred process embodying the present invention.

FIG. 2 is a semi-diagramatic vertical sectional view illustrating the preliminary drying step in which the freshly cooked potatoes are subdivided and subjected to drying prior to forming.

FIG. 3 is a view illustrating the same stage shown in FIG. 2 utilizing automatic equipment for agitating the bed as it dries.

FIG. 4 is a perspective view of one finished product partly in section.

SUMMARY OF THE INVENTION

In accordance with the present invention an improved process is provided for preparing cooked and shaped potato products. Examples of such products are any of a variety of products that can be fabricated from a cooked potato mash such as french fries, scalloped potatoes, au gratin potatoes, etc. In the first stage of the process the potatoes are cooked to a state where they can be mashed. Either before or after cooking, the peels are removed. Potatoes are then subdivided to provide pieces of less than ¼" in thickness unless already subdivided to this size. For example, cooked potato pieces can be used that have a thickness typically about 1/16" to 5/32" and perhaps as much as ¼" in thickness or more.

In one form of the invention, the potatoes are subdivided by forcing them through a screen or perforated metal element to provide a riced potato. Next, the subdivided cooked potato which has a solids content of about 20% by weight is predried to raise the solids content to about 29-40% by weight either at atmospheric pressure or under vacuum. All quantities herein are expressed on a weight basis. The partially dried mass made up of the pieces prepared as described above is then formed into a potato product of a predetermined shape, for example by molding pressing, extrusion or other forming operation. In one preferred form of the invention, the shaped pieces are then further dried and refrigerated or frozen prior to being consumed. In one preferred form of the invention, the formed potatoes are frozen and fried in hot fat just prior to being served.

It is preferred that the potatoes be sliced before being cooked. In that event the potatoes are cooked using steam at atmospheric pressure in a sliced condition with the peels remaining in place, the cooked slices can be pressed through a screen or perforated metal plate or between two such screens or plates to force the cooked potato through the openings therein while collecting the peels on the surface of the screen. By pressing the cooked slices in this way, the peels are removed and simultaneously the potato is subdivided as required for the preliminary drying step. The subdivided pieces then comprise the partially broken strands of so-called riced potato which was forced through the openings in the screen or other perforate member.

While not preferred, the potatoes can be cooked in two stages with the chilling step carried out between the two cooking steps for the purpose of reducing pastiness and free starch as described in U.S. Pat. No. 3,012,897 which is incorporated herein by reference.

As mentioned before, after the cooking has been completed and after the peels have been removed whether with a knife or by screening, the cooked potato is further subdivided and subjected to preliminary drying. It should be understood however that if initial slicing has reduced the potato pieces to ¼" or less in thickness, further subdividing is unnecessary. After the preliminary drying step, the potato mash is formed into the shape that it is to take during shipment and when consumed.

Shaping or forming can be carried out in many ways, for example by stamping, molding, pressing extrusion through a die or passing between patterned rolls or the like so as to compress the mash somewhat and simultaneously shape it to a predetermined form or design. The design can either be fanciful such as the shape of an animal, star, crescent, letter of the alphabet, etc. or it can resemble a well known potato product such as american or french fried potatoes, crinkel cut french fried potatoes, scalloped, etc. The invention will be described in more detail herein below in connection with french fried potatoes by way of example. When the shaped products are french fried potatoes, they are preferably exposed to moisture and then further dried to form a skin on the surface generally as described in U.S. Pat. No. 3,812,274 which is incorporated herein by reference. It has been found however that the extruded pieces need not be dried before being wetted.

During the preliminary drying of the potato before forming in accordance with the present invention, it is important to have the potatoes in a subdivided condition.

Merely heating the potato is unsatisfactory since it causes the finished product to become pasty rather than having the natural mealy or grainy texture of cooked fresh potatoes particularly if accompanied by mixing.

Subdividing, however, can be accomplished in many ways, for example by slicing with knives or other like instruments, by splitting the pieces with an air stream, mechanical impact or by pressing through openings of the like so as to form extruded strands or ribbons of riced potato as already described. For practical drying speeds it is preferred that the size of the subdivided pieces be less than about ¼" or so in thickness in order for drying to be accomplished efficiently. However, it is most preferred that the subdivided pieces be about 1/16" to 5/32". For example, if riced, excellent results can be accomplished by using a perforated plate with a 3/32" round openings and having a 25% open area.

It is also desirable, although not utterly essential, that the subdivided potato be agitated, e.g., by tumbling, during the preliminary drying step. In one preferred form of the invention, riced potato is placed on a screen to form a horizontal bed having a depth of about two or three inches and dried with air at room temperatures blown upwardly through the bed. During the entire drying period the bed is agitated by turning it over and over manually with a large spatula. The agitation of the bed does not have to be uninterrupted. It is entirely possible for a period of a minute or two to elapse while drying is carried out without agitating the bed. Constant agitation does however, speed up the drying process and prevents case hardening as well as overdrying of certain parts and underdrying of other parts. In one preferred form of the invention, the mass of potatoes is tumbled over and over continuously by placing the mass on a moving surface such as the inside of a cylinder or the like which is rotated at a constant rate. Drying can be accomplished by using drying air with a moisture content low enough so that it will accept additional moisture, i.e., so that moisture will be free to transfer from the potatoes to the stream of air passing through the mass. During drying the solids content of the freshly cooked potatoes is increased from about 20% solids to about 29–40% but preferably from 29%–35% solids and the temperature is preferably reduced to or maintained at 100° F. or below. The potato is then preferably packed, e.g., by pressing it into a container with the hands and allowed to rest for 30 minutes.

The mass is now ready for shaping or molding as described above. When the pieces are formed by extrusion through a die, it was discovered that a very marked change and decided improvement could be achieved in surface toughness by holding the open area of the die at least about 20% up to about 60% and preferably about 40–50, e.g., 43% of the cross sectional area of the extrusion cylinder. An open area of 43% corresponds to a pressure of about 12 psi max in the extruder as the potato is extruded. The pressure should not exceed 15 psi. By contrast, pressure developed in the extruder described in U.S. Pat. No. 3,812,274 is much higher and results in a product which has a tough skin when the mash is predried as described herein.

DETAILED DESCRIPTION OF THE INVENTION

The invention will now be described in detail with particular reference to the flow chart of FIG. 1 and FIGS. 2 and 3 which illustrate the drying step performed after cooking and before forming. The following description illustrates the invention as used in the production of simulated french fried potatoes. It can however be used for preparing any of the products referred to above.

The process is begun with ordinary potatoes, *Solanum tuberosum*. The potatoes which can be of any suitable strain such as Kennebeck, Norchip, Pontiac or Russett are flumed, washed, inspected to remove defects and sliced. While there are no precise limits on the size of the slices, the best results are obtained with slices one-fourth to three-fourths inches thick and preferably from one-half to five-eighths of an inch thick slices. The sliced potatoes are then cooked in any suitable known manner. Steam cooking can be performed at atmospheric pressure for about 7–15 minutes. Cooking is preferably carried out so that the potatoes are brought just to the fully cooked state, i.e., to a mesh consistency. In this condition, the potatoes when pressed between the fingers will be reduced to a mash with few lumps present. This stage is usually reached after cooking for 9 to 11 minutes with the steam at atmospheric pressure.

Cooking can also be carried out using the two stage cook system with an intermediate chilling step as described in U.S. Pat. No. 3,012,897. In this process the sliced potato pieces with the skins still in place are blanched in hot water for 20 minutes at from 155° to 165° F. and preferably at about 158° to 162° F. They are then cooled for about 17 to 23 minutes on the average in water typically at about 55° F. so that the slab is cooled down to about 70° F. or below in 10 minutes. Final cooking is carried out in steam at atmospheric pressure for about 10 to 16 minutes and preferably for about 10 to 12 minutes in the case of fabricated molded potato products with which the invention is concerned.

After cooking the potato pieces are further subdivided if not already ¼" or less in thickness and, partially dried. The cooked potatoes can be subdivided in a variety of ways such as by crushing, slicing, impact, screening, air blast, etc. When subdivided, the potatoes should have a thickness of no more than about one-quarter inch. The exact size is not critical. One of the most convenient and effective ways found for subdividing the potatoes is to rice them by forcing them through a screen having openings of between about 1/16 and 5/32 inches across. Before this stage or during it, the peels should be removed by one means or other. If the pieces are subdivided by being cut they can be diced to about ¼" on a side, however, as mentioned above, it is preferred to rice them and this can be done by pressing them through openings to form broken strands. Unless the peels have been removed prior to cooking, they can be separated while the potatoes are being riced as described in U.S. Pat. No. 3,862,345 which is also incorporated herein by reference. The screen used for ricing the cooked potatoes should be at least about 25% open. Openings of 1/32" to ¼" are preferred and the most preferred opening size is from 1/16" to about 5/32". The riced potato is supported upon a screen or perforated plate, maintained in porous condition and partially dried, preferably by flowing air through it either upwardly or downwardly through the porous mass. Any amount of drying produces some effect. However, for practical purposes, it is usually necessary to increase the solids content from about 20% by weight which is typically for cooked potatoes to about 29%–40% and preferably from 29%–35% by weight. The solids content of 29%–40% appears critical to success. If less than 29%, the interior is perceptably porous or soft. If above 36%, some judge the product too dry. If above 40%, the product is too dense and the surface is irregular rendering the product unsatisfactory. The solids content to start with is almost always about 20% but varies from about 15%–24% with variety, age, etc.

If air drying is used, the drying air should be no warmer than the temperature of the cooked potatoes and preferably below 150° F. The best results have been achieved with air at room temperature, i.e., 70° F. or less. Air refrigerated to 32° F. can be used but there is usually little advantage in doing so and accordingly air at a temperature of about 70° F. or so is satisfactory. The air should not be saturated with moisture or no drying will occur. Thus, air can be either room temperature air, heated air or cool air but must have a relative humidity of less than 100 percent to be useful. Using air at a temperature of less than 150° F. and preferably at 70° F. or below is highly preferred to heated air since a degree of cooling is achieved while drying takes place. It was discovered that this cooling is beneficial in preventing the development of free starch. This helps keep the product grainy or mealy like freshly cooked potatoes. It will be recognized that even using air at 150° F., cooling can take place due to evaporation. In any event, it is usually more practical and less costly to use ambient air and this will be effective for drying the product as well as cooling it. Heated air will dry the product faster but some of the cooling effect is lost, thus, making room air preferable to warm air. Of course, outside air can, if desired, be used and during winter months its temperature may be 0° F. at 30 percent relative humidity. If such air is heated to 70° F., its relative humidity may drop to 5 percent or so. This air will be very effective for drying the bed quickly.

It is preferred that the product be kept loose, i.e., porous while air flows through the pieces during the drying step. If the product is placed on a solid supporting surface as opposed to perforated or metal sheet or screen it will be difficult to achieve circulation of the drying air through the product. Accordingly, a perforate supporting surface is greatly preferred. It is also highly beneficial to agitate the product during the drying process either manually with a spatula or similar instrument or automatically.

Refer now to FIGS. 2 and 3 which illustrate two different ways in which the drying of the porous mash can be accomplished.

As seen in FIG. 2, strands 10 of riced potato are placed in a bed about 6 inches thick on a supporting screen 14 within a drying 16 having vertically disclosed sidewalls 16a and 16b, a bottom wall 16c and air inlet duct 16d through which room air (70° F.) at less than 100 percent relative humidity, e.g., 40 percent relative humidity, is blown continuously so as to pass upwardly through the screen and bed 12 until the moisture content of the riced potato in the bed has been reduced to the desired value. The air passes through all portions of the bed and between the interstices in the porous riced potato. Preferably on a more or less continuous basis, the bed is agitated manually with a spatula by turning it over and over on itself. The mash is typically dried to about 29%–35% solids by weight in about 15 minutes.

Refer now to FIG. 3 which illustrates another way in which the freshly cooked mash can be dried. As seen in the figures, the strands 10 of the riced potato form bed 12 several inches thick at the bottom of a horizontally disposed elongated drum 18 with a cylindrical sidewall having openings 20 throughout. The drum includes two end walls 22 only one of which is shown and a plurality of longitudinally extending internal flanges 24 with ends 28 that project inward from the inner surface of the drum and are rigidly connected thereto at 26 as by welding. Each flange extends in the opposite direction, i.e., away from the direction of rotation of the drum. The flanges 24 keep the potato from passing outwardly through the openings 20 in the drum 18. The drum is supported upon a horizontal axle 30 only the end furthest from the viewer can be seen in the figure. The drum is slowly rotated during the operation by a drive motor and associated drive sprocket and chain assembly 31. The drum is supported so that its lower aspect is enclosed within a housing 32 having sidewalls 32a and 32b the upper ends of which form a close fit with the outside surface of the drum and end walls 34 to provide a chamber to which drying air is introduced through inlet 32c at a temperature of about 70° F. while the drum 18 is rotated. An apparatus of the kind illustrated in FIG. 3 can be obtained from the Roto Louvre co. of Chicago, Ill., division of Link Belt, Inc. To begin the drying, about 500 pounds of cooked rice potato is introduced into the drum at one time and the drum is slowly rotated for about 5 to 15 minutes until the required amount of moisture has been removed. The dried mash potato is then removed, preferably pressed, e.g., into a receptacle and allowed to stand for a time, typically 30 minutes and formed as described below.

Any amount of cooling during the drying stage will have some effect in improving or reducing pastiness and insuring that the potatoes retain the grainy character of fresh mash potatoes but more cooling will produce a greater improvement. It is preferred that the drying step be performed until the potato mash has been cooled to 100° F. or below and preferably to room temperature, i.e., 70° F. or less.

In addition to the dryers described above, it is also possible to use other drying methods such as microwave drying or fluidized bed drying in which case enough air is passed upwardly through the riced potatoes so that the flow of air actually lifts the riced potato and suspends it within the dryer.

It was discovered that less off flavor is present if drying is carried out under vacuum. The drum 18 is preferably rotated in a vacuum chamber (not shown) at for example 29" Hg while the temperature typically drops from about 150° F.–180° F. down to 75° F. as solids rise to 30% by weight. This usually takes about 3.5–4 hours. The amount of vacuum is not critical.

It is important during drying that the potatoes are kept in subdivided or riced form which will be referred to herein for convenience as a loose state containing air passages rather than returning to a more or less solid mass of mashed potatoes in order to obtain proper air or vapor circulation through the cracks and interstices between the pieces and maintain uniformity during drying.

The predried mash prepared in this manner is used, except as otherwise stated below, generally in the manner described in U.S. Pat. No. 3,812,274 to forming french fries. This is done by extruding several wide ribbons that have cross sections, for example, of about ¼" to 2 to 4". These ribbons are cut each ¼" to form pieces that are ¼"×¼" or other cross sectional sizes up to ⅜" or so in one or both directions. It is to be understood that the die dimensions are merely set forth by example. Substantially larger openings are contemplated for large scale production equipment. By so forming the pieces, the open area of the die can be made over 20% and even about 60% or more of the extrusion cylinder cross sectional area thereby keeping extrusion pressure quite low. It was discovered that this prevents the formation of a tough skin that otherwise forms on a high solids mash (29% to 40% by weight solids). If such a skin is present it will interfere with subsequent surface moisturization and drying. The extruded and shaped mash potato is then treated to form a thin crust or case hardened layer on its surface by optionally exposing the formed pieces first to hot air, then to moisture such as steam preferably while they are still hot for a brief period of time. In the alternative, a water spray can be used in place of steam to wet the surfaces of the pieces. The pieces are then contacted with hot air until they have lost additional weight all as described in U.S. Pat. No. 3,812,274. At present the drying step immediately preceding moisturization of the formed pieces is not used.

If the potatoes are to be used immediately, they are then fried in deep fat or baked in a hot oven. For most purposes however, it is preferred to refrigerate or freeze the pieces for shipment and storage and to carry out a heating operation just prior to serving. The freezing (or refrigeration) and heating steps are entirely conventional. If heated in deep fat, they can be fried as desired, e.g., about 30 to 120 seconds at 340° F. to 375° F. If, in the alternative, it is desired to finish heating in a baking oven, the product should be deep fat fried at the factory and then frozen. It can then be heated by baking in the oven at 450° F. for 5 to 12 minutes.

To provide a specific example of the invention in the production of simulated french fried potatoes, 5,000 grams of fresh mash potato are sliced at ⅜" thick slabs, cooked in steam at 212° F. for 10 minutes at atmospheric pressure at which point they will have just reached mash consistency. They are then simultaneously peeled and riced as described in U.S. Pat. No. 3,862,345. The riced potato is dried with room temperature air at 70° F. for 15 minutes to produce a solids content of 29%–35%. Drying is carried out in a bed as shown in FIG. 2 with continuous manual agitation. During agitation the riced potatoes remain surprisingly porous.

The potatoes prepared in this way are passed through a forming die at which is about 43% open. The extruder has a round die with 8 die openings each measuring ¼" high ×2¾" long. The ribbons extruded through these openings are cut at quarter inch intervals to produce french fries measuring ¼"×¼"×2¾" to 4". A piston used to force the mash through the die openings produces a pressure of about 12 psi.

The pieces formed in this manner are placed on a conveyor and steamed for 5 to 150, e.g., 90 seconds at atmospheric pressure and finally dried to produce a 15 to 5 percent and preferably a 18 to 22 percent weight loss. This can be achieved by drying for about 2½ to 4 minutes and preferably about 3 minutes with air heated to a temperature of 260° F. and having a velocity of about 400 feet per minute.

Additives can be used to prevent color, texture or taste deterioration. The additives can be the same as those used and fully described in the prior art, e.g., sulfates and monoglycerides as described in U.S. Pat. Nos. 3,862,345 and 3,812,274. If desired, these preservatives can be added by mixing them with the potato as they are riced. Thus, additives such as monoglycerides can be added as a paste or spray at the ricer to help reduce the pastiness and aid in providing the desired grainy or mealy texture of natural freshly cooked potato.

A finished french fried product shown in FIG. 4 comprises elongated pieces which are generally rectangular in configuration. Each includes a center portion 42 which is firm, granular or mealy and an outside layer 44 which is relatively stiff and crisp. The inside portion 42 lacks the voids, mushiness or mash potato consistency of a simulated french fry made without using the preliminary mash drying step performed in accordance with the invention. While the reason for the effectiveness of the invention is not known with certainty, it is believed to be due in part by the higher solids content and in part to better bonding of the starch granules to one another in the interior of the finished pieces. It is also possible that the higher solids contents of the material at the time of molding or extrusion facilitates gelling of the mass thereby giving the interior a firmer texture.

The invention also helps to reduce starch damage thereby producing a less pasty product probably as a result of the cooling that takes place during the preliminary mash drying step. Moreover, since there is less frying and drying time required for the finished pieces, less enzymatic browning and cooking takes place. This improves color and helps to reduce the removal of volitile flavor components. Another advantage of the invention is that the higher solids content of the mash facilitates extrusion and helps the extended pieces hold their shape better. The invention will be better understood by reference to the following examples:

EXAMPLE 1

White potatoes (Norchip) are sliced to ⅜" thickness and cooked in steam at 210° F. for 12 minutes. To the cooked potatoes are added 0.5% by weight glycerides and 0.3% by weight dextrose. The pieces are then riced by pressing them through a screen having 3/32" diameter openings. The screen also removes the peels. The hot porous freshly riced potato is placed in a bed over a screen through which room temperature air is passed raising the solids from 24% to 32% while being turned occasionally by hand. The dried material is extruded at 15 psi to form french fry sized pieces. These pieces are texturized with steam at 207° F. for 90 seconds. They are then dried to 59.2% moisture, held for 1.5 hour at 40° F. and blast frozen.

EXAMPLE 2

(comparative example)

Formed potato pieces are prepared as in Example 1 except that the riced potato is not dried but kept at 24% solids. The formed pieces are predried in the general manner described in U.S. Pat. No. 3,812,274 with air at 260° F. for 40 seconds, texturized with 207° F. steam for 40 seconds then dried to 62.6% moisture held for 1.5 hour at 40° F. and blast frozen.

EXAMPLE 3

(comparative example)

Commercially available frozen french fried potatoes are obtained. These pieces are formed from natural potato slices rather than from a mash.

RESULTS:

The results of a sensory test conducted with a test panel comparing Example 1 to 3 on a scale of 0-60 is set forth below. Higher numbers indicate greater perceived amounts. Brackets indicate no mathematically significant difference.

| CHARACTER-ISTIC | EXAMPLE 2 | EXAMPLE 1 | EXAMPLE 3 |
|---|---|---|---|
| Body (hollow to full) | 17.2 | 28.2 | 32.9 |
| Time in Mouth (brief to persistent) | 20.3 | 26.1 | 29.9 |
| Consistency (soft to firm) | 16.8 | 20.3 | 26.9 |

Soft x-ray photographs taken along the axis of each sample showed that before frying Example 1 had no voids, Example 2 had about 5–10% voids and Example 3 had slight voids (less than 5%). After the product is taken from the package and fried, Example 1 had about 20% voids, Example 2 had about 50% voids, and the interior material pulled away from the crisp exterior. Example 3 had about 30–40% voids but the interior did not pull away from the crisp exterior as in 2. These tests and x-ray photos show that a much more natural consistency or texture can be obtained by means of the invention.

It can thus be seen that the invention provides a unique product having no voids while the product of U.S. Pat. No. 3,812,274 has 5–10% voids and it is largely the absence of internal holes and fissures that gives the product of the invention its excellent interior texture.

EXAMPLE 4

Potatoes are prepared as in Example 1 except that the riced mash is tumbled in a perforated drum enclosed within a vacuum chamber at 28" Hg for 6 hours at which time the solids content has reached 40% by weight.

The pieces are formed by rolling the mash to sheet form and cutting with a cookie cutter.

EXAMPLE 5

Potato is prepared as in Example 1, except that the riced mash is dried to 29% solids by placing it in a microwave oven set for warming food.

The pieces are formed by rolling the mash between contacting rolls having mating pockets to receive the mash and mold it to finished form.

EXAMPLE 6

Products are prepared as in Example 1 except that the riced mash is dried to 36% solids by weight in a fluidized bed dryer in which the potato is supported by a rising stream of room temperature air.

The pieces are formed by injecting the mash with a plunger into shaped dies then opening the dies and ejecting the molded pieces.

What is claimed is:

1. A process for preparing cooked and shaped potato products from a mash comprising the steps of cooking potatoes to a state in which the potatoes can be mashed, either before or after cooking removing the peel, subdividing the cooked potato to provide pieces having a thickness of less than about ¼", partially drying the pieces to raise the solids content to about 29%–40% by weight, thereafter forming the cooked partially dried potato to predetermined shape.

2. The process of claim 1 wherein the potato product of predetermined shape is further dried to reduce the moisture content thereof following the forming step.

3. The process of claim 2 wherein the shaped pieces are partially dried after being formed to removed at least 10 percent by weight of the moisture therefrom and are thereafter chilled to below room temperature either by being refrigerated or frozen for distribution and storage.

4. The process of claim 1 wherein the raw potatoes are sliced and cooked to a mash consistency with the peels remaining in place, the cooked pieces are then subjected to pressure to thereby force the potato through a perforate member to rice them and thereby provide said subdivided pieces, the pieces comprise strands of potato formed through said openings and the strands are no more than ¼" in thickness.

5. The process of claim 4 wherein the peels are removed by being collected on the surface of the perforate member.

6. The process of claim 4 wherein the potato is cooked in a first cooking stage, thereafter chilled to at least about 70° F. or below and then cooked a second time prior to being subdivided.

7. The process of claim 1 wherein forming the potato to predetermined shape comprises extruding the potato through a die of predetermined cross sectional shape at a pressure of 15 psi or less to provide in a final product a predetermined shape.

8. The process of claim 7 wherein the finished formed potato is chilled to either a refrigerated or frozen state.

9. The process of claim 4 wherein (a) the raw potato is sliced and cooked to a mash consistency with the peels in place (b) the peels are removed by being collected on the surface of the perforate member, (c) the potato is pressed to form a predetermined cross sectional shape at a pressure of 15 psi or less to provide in a final product a predetermined shape and thereafter the finished shape potato is chilled to either a refrigerated or frozen temperature.

10. The process of claim 9 wherein the finished pieces are fried in fat prior to serving.

11. The process of claim 9 wherein the formed pieces are exposed to moisture to form a skin on the surface thereof and then further dried prior to chilling.

12. The process of claim 1 wherein the pieces are cooled to 100° F. or below as they are dried.

13. The process of claim 1 wherein the potato is formed by extrusion through a cylinder and the maximum pressure of extrusion is controlled by means of an extrusion die which has at least 20% of the cross sectional area of the cylinder.

14. The process of claim 10 wherein the potato is formed by extrusion through a cylinder and the maximum pressure of extrusion is controlled by means of an extrusion die which has at least 20% of the cross sectional area of the cylinder.

15. The process of claim 1 wherein the cooked subdivided potato is maintained in a loose state containing air passages during partial drying to 29–35% solids by circulating dry air through said passages.

16. The process of claim 1 wherein the subdivided cooked potato is subjected to vacuum drying for sufficient time to reduce the moisture content to 29–40% by weight prior to forming.

17. The process of claim 1 wherein the subdivided potato is partially dried by exposing it to microwave energy.

18. The potato product prepared by the process of claim 1.

19. The potato product prepared by the process of claim 9.

20. The process of claim 1 wherein said partial drying is accomplished by air drying the subdivided pieces at a temperature below 150° C.

21. The process of claim 20 wherein said temperature is room temperature.

* * * * *